United States Patent [19]

Eggert, Jr.

[11] 4,295,790

[45] Oct. 20, 1981

[54] BLADE STRUCTURE FOR USE IN A WINDMILL

[75] Inventor: Walter S. Eggert, Jr., Huntington Valley, Pa.

[73] Assignee: The Budd Company, Troy, Mich.

[21] Appl. No.: 50,687

[22] Filed: Jun. 21, 1979

[51] Int. Cl.³ .................... F03D 1/06; B64C 11/26
[52] U.S. Cl. ................................ 416/226; 416/230
[58] Field of Search ...................... 416/226, 230 A

[56] References Cited

U.S. PATENT DOCUMENTS

| | | | |
|---|---|---|---|
| 2,362,301 | 11/1944 | Pecker | 416/226 X |
| 2,648,388 | 8/1953 | Haines et al. | 416/226 X |
| 2,734,586 | 2/1956 | Wright et al. | 416/226 |
| 2,981,337 | 4/1961 | Stuart | 416/226 |
| 3,018,832 | 1/1962 | Prewitt | 416/230 A X |
| 3,103,977 | 9/1963 | Negroni | 416/226 X |
| 3,484,174 | 12/1969 | McCoubrey | 416/226 X |
| 3,552,881 | 1/1971 | Rogers et al. | 416/226 X |
| 4,081,220 | 3/1978 | Andrews | 416/226 |

FOREIGN PATENT DOCUMENTS

| | | | |
|---|---|---|---|
| 459632 | 9/1949 | Canada | 416/226 |
| 591878 | 9/1947 | United Kingdom | 416/226 |

Primary Examiner—Everette A. Powell, Jr.
Attorney, Agent, or Firm—A. L. Trueax, Jr.

[57] ABSTRACT

A tapered blade for use in a windmill comprises a main spar or beam assembly having top and bottom flat sheets of metal. Tapered angle strips are welded along the edges of the sheets. With the sheets and strips twisted to the proper angles, they are joined together by shear web channels welded along the edges of the strips. Leading and trailing edge assemblies, comprising primarily foam material, are bonded to the spar. A fitting is provided to permit the blade to be attached to the mechanism to be driven on the windmill.

10 Claims, 9 Drawing Figures

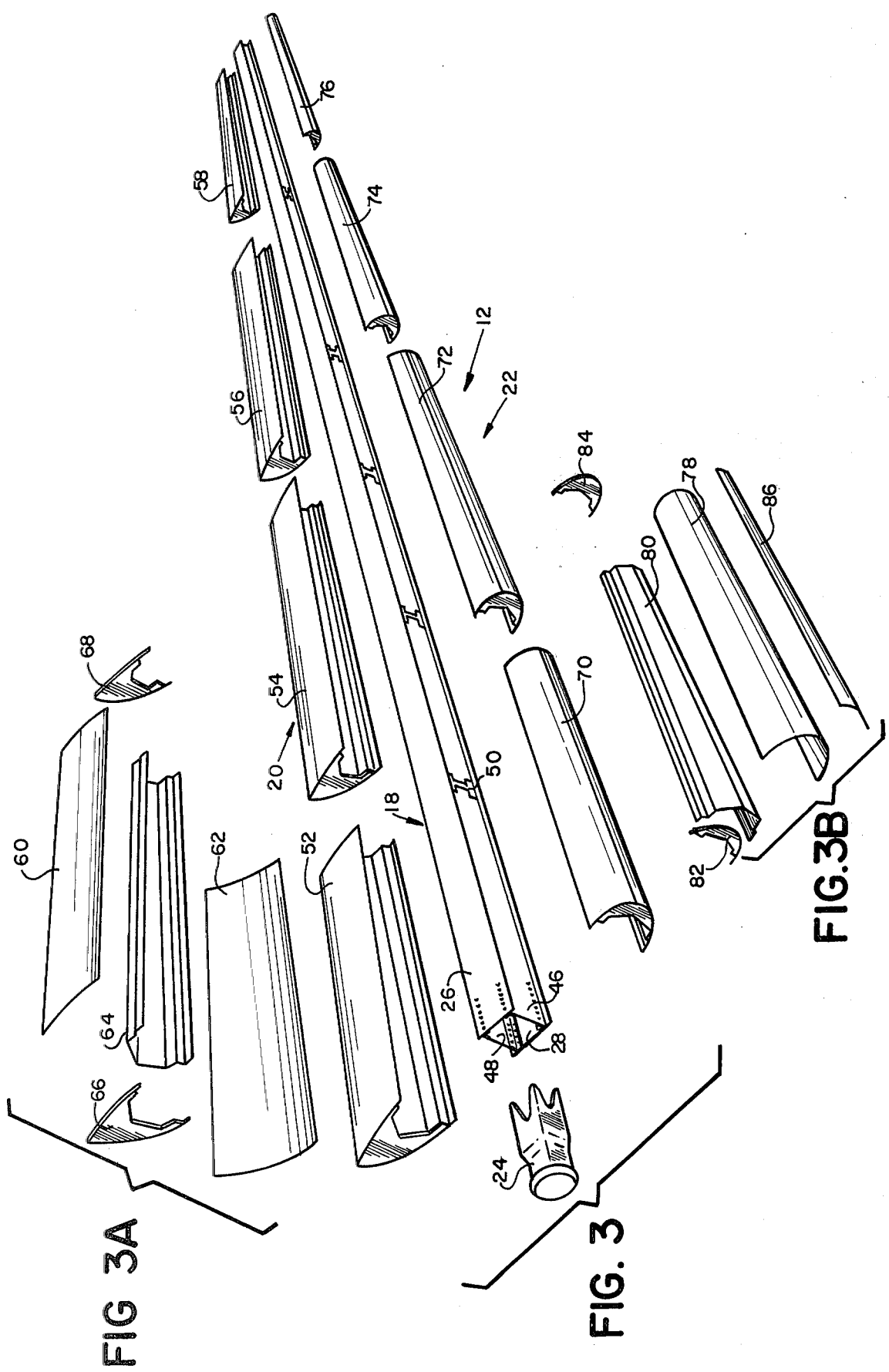

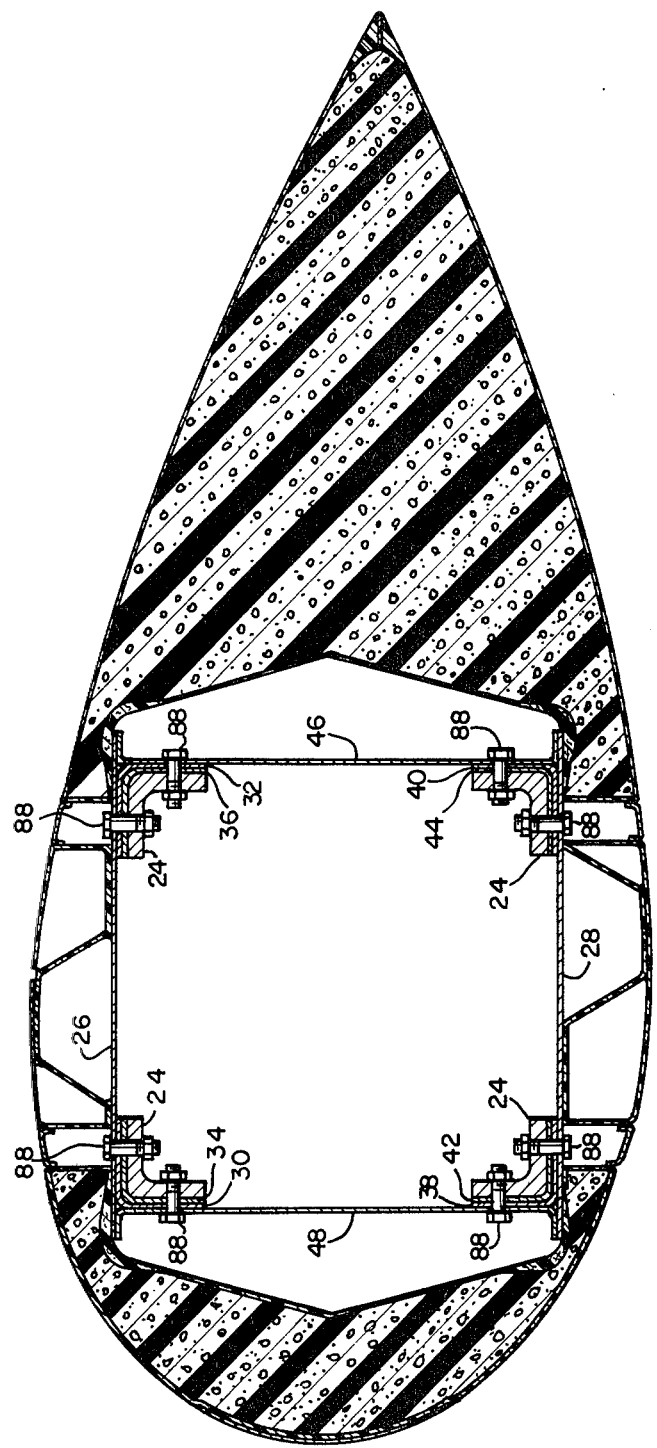

BLADE STRUCTURE FOR USE IN A WINDMILL

The generation of electrical energy by windmills is well known. In such windmills, energy is generated by the wind being slowed down by propeller blades which are suitably connected to rotate and respond to wind movement. Power from windmills has been used for pumping water on farms, for example, as well as furnishing electrical power for other purposes. The number of blades used may vary in accordance with the particular application. A propeller type two blade mill generally collects more power from the air than many multi-blade types. This type is relatively light and has been used commercially in wind driven electric generating plants.

Generally, blades and propellers are designed to fit existing systems and to operate at different speeds. The geometric design of the blades may vary in accordance with the particular application. However, in general, it is desirable to have the blade twisted to some predetermined angle to provide maximum operating efficiency and response to wind. The thrust and power absorbed by a propeller under any given set of conditions is generally computed before actually determining what kind of propeller blade to use in a windmill.

A blade assembly must be relatively strong. This requires a relatively strong spar or beam generally disposed toward the center of the blade structure. It is generally difficult to twist the spar surfaces to the desired angle to provide maximum operating efficiency for the blade when relatively strong materials are used. Such spars, when built for strength and proper angular configuration, are generally very costly.

It is an object of this invention to provide a novel blade for use in a windmill wherein the spar or beam element may be made relatively inexpensively.

It is a further object of this invention to provide an improved blade for use in a windmill in which the parts used to make the spar are readily twisted to a desired angle.

It is a further object of this invention to provide an improved blade for use in a windmill in which the shape of the external blade is readily formed by inexpensive material.

It is a further object of this invention to provide an improved blade for use in a windmill and methods of making said blade wherein mass production techniques may be employed in producing the blade.

In accordance with the present invention, a tapered blade structure for use in a windmill includes a main spar or beam assembly. The assembly comprises top and bottom spaced elongated longitudinally extending metal sheets. One or more pairs of tapered angle strip elements are secured along opposite longitudinal edges of the sheets. After twisting the sheets and angles to the desired angle and holding them fixed, a pair of shear web channels are secured between the angle strip elements between said top and bottom sheets. A fitting to permit attachment of the blade to a windmill is secured to the end of said sheets and shear web channels to complete the spar structure. Trailing and leading edge assemblies are bonded to the opposite sides of the spar. These assemblies provide the proper shape for the blade and are made up primarily of plastic and foam elements.

Other objects and advantages of the present invention will be apparent and suggest themselves to those skilled in the art, from a reading of the following specification and claims, taken in conjunction with the accompanying drawings, in which:

FIG. 3 is an exploded view showing the elements making up the blade structure illustrated in FIGS. 2A and 2B;

FIG. 3A is an exploded view illustrating the parts making up one of the trailing edge segments illustrated in FIG. 3;

FIG. 3B is an exploded view illustrating one of the parts making up one of the leading edge segments illustrated in FIG. 3;

FIG. 4 is a cross-sectional view taken along lines 4—4 of FIG. 2B;

It is noted that the cross-sectional views, while illustrated as being the same sizes, are actually different tapered sizes, being largest at the inboard or hub end of the blade and gradually becoming smaller as the blade is tapered towards the outboard or tip of the blade. For example, in a typical embodiment the width of the view in FIG. 4 may be 54 inches; the width in FIG. 5, 54 inches, and the width in FIG. 6, 18 inches.

Figure 1:
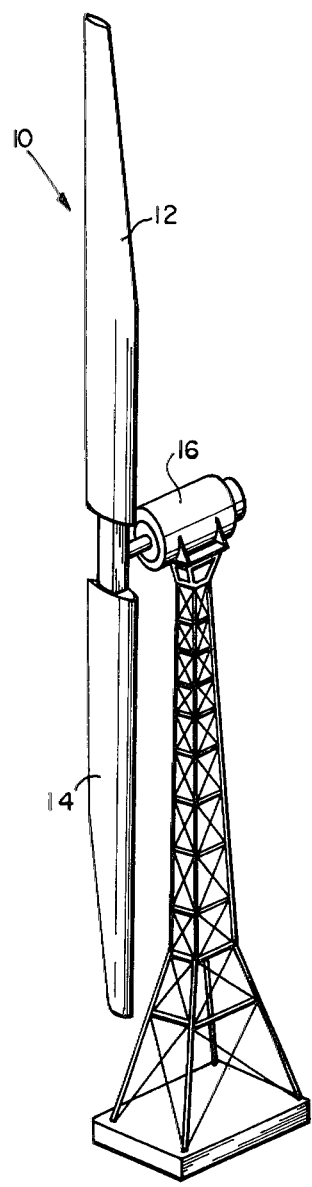
FIG. 1 is a view of a typical windmill which may use the blade structure of the present invention.
Figure 2B:
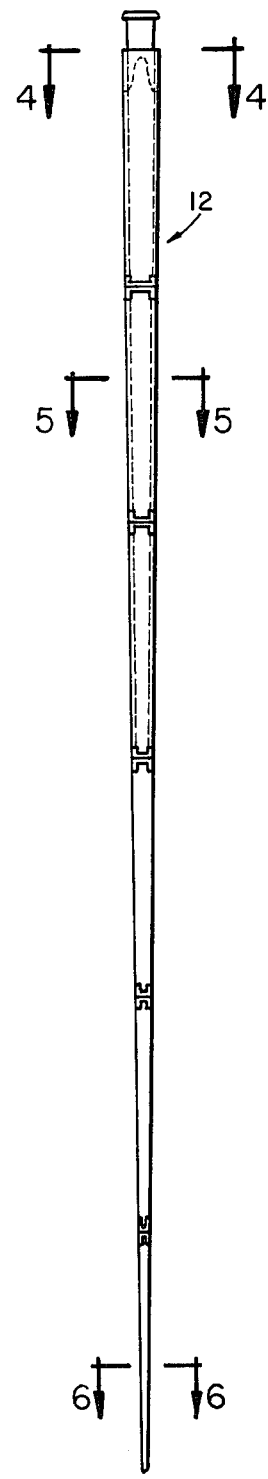
FIG. 2B is a front view illustrating one of the blades illustrated in FIG. 1.
Figure 2A:
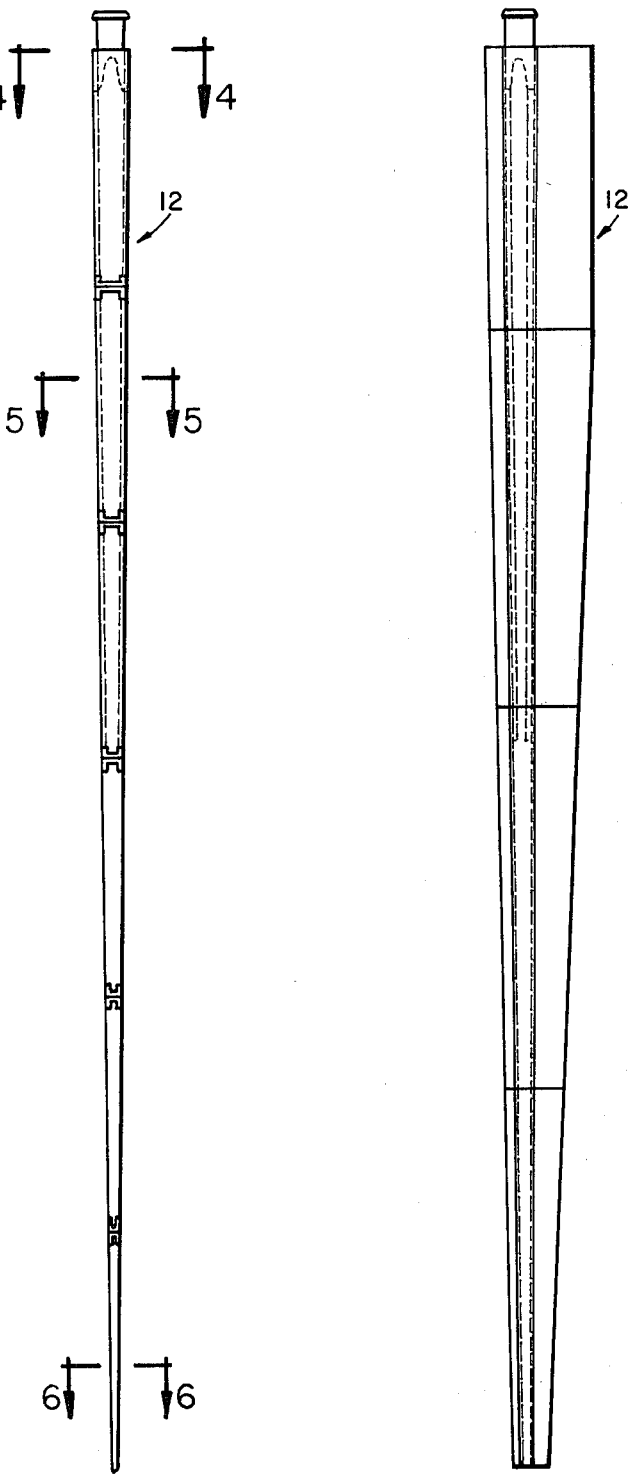
FIG. 2A is a plan view of one of the blades which may be used in the windmill illustrated in FIG. 1.

Referring to FIG. 1, a windmill 10 comprises a pair of blades 12 and 14 adapted to move about a hub or center on a mechanical structure of the windmill. The diameter of the blades may be in the order of 125 feet. This means that the lengths of each of the blades 12 and 14 may be on the order of 60 feet. The length of the blades may be longer or shorter depending upon the particular application.

When the blades 12 and 14 are rotated by the wind, power is generated in a generator 16. The electrical power and generator may be transmitted by suitable electrical lines to drive various devices, such as pumps, or to provide electrical power for other devices.

Referring to the other figures of the drawings, and particularly to FIG. 3, the blade 12 comprises a spar assembly 18, a trailing edge assembly 20, a leading edge assembly 22 and a root fitting 24. The spar assembly 18 is made up of two single elongated sheets while leading and trailing edge assemblies 22 and 20 are broken down or subdivided into separate segments, as will be described.

The spar assembly 18 comprises top and bottom elongated metal sheets 26 and 28 extending the full length of the blade 12. Preferably, these sheets 26 and 28 may be made of stainless steel with no splices therein and may be in the order of 0.125 inches thick. Welded to the strips 26 and 28 are four cap strip assemblies. The four strip assemblies each comprising either eight or four angle strips composed of 0.125 thick stainless steel, 400 inches long.

Figure 5:
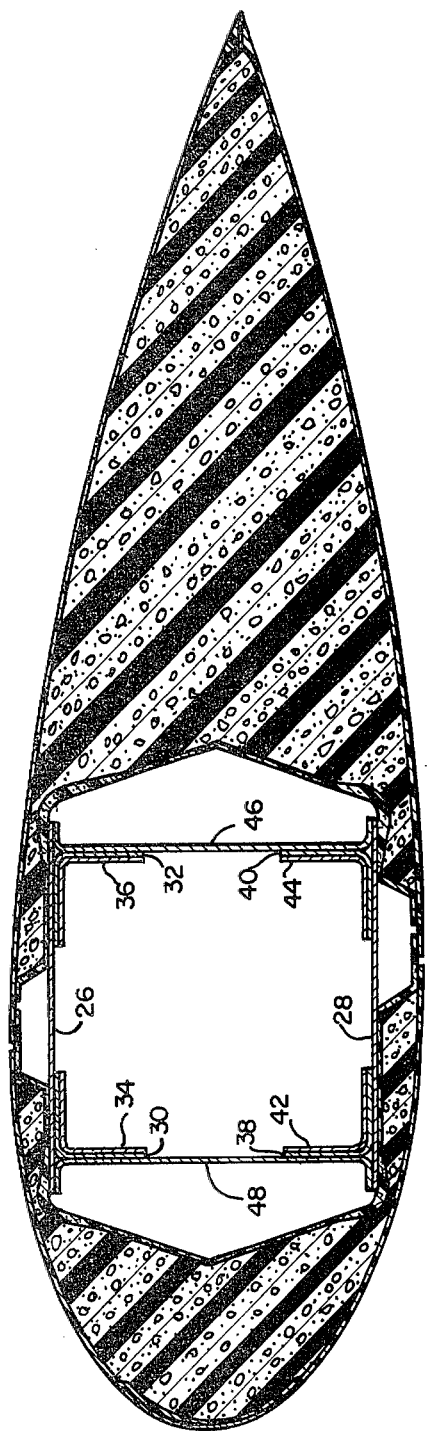
FIG. 5 is a view taken along lines 5—5 of FIG. 2B.
Figure 6:
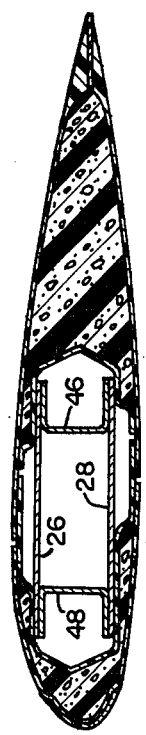
FIG. 6 is a view taken along lines 6—6 of FIG. 2B.

As more clearly illustrated in cross-sectional views in FIGS. 4 and 5, the upper angle strips associated with the top sheet 26 includes two inner angle strips 30 and 32 and two outer angle strips 34 and 36. The lower angle strips involving the bottom sheet 28 are substantially the same as the upper assembly. The lower assembly includes an inner pair of inner angle strips 38 and 40 and a pair of outer angle strips 42 and 44. The various strips 30 to 44 are disposed in the corners of the spar assembly 18.

The inner angle strips 30, 32, 38 and 40 may be composed of 0.125 thick stainless steel approximately 400 inches long. These angle strips may be tapered from approximately 3½ inches by 3½ inches on the inner end of the blade to approximately 1½ inches by 1½ inches at the outer edge. The second set of outer angle strips 34, 36, 42 and 44 are only approximately 250 inches long, but may also be tapered from about 3½ by 3½ inches to about 1½ by 1½ inches at the tip of the blade. It is noted that in FIG. 5, only the inner angle strips are present and in FIG. 6 that none of the angle strips are present. This is because the tapering of the blade requires less reinforcement as the blade extends outwardly away from the hub.

Metal shear webs 46 and 48, preferably composed of brake form channels approximately 10 feet long, are provided between the upper and lower sheets 26 and 28. There are approximately six of these channels in the leading edge and six in the trailing edge portion of the spar web assembly. The two inboard channels are approximately 0.125 thickness stainless steel, the next two going outboard are approximately 0.090 stainless steel channels and the last two toward the tip are 0.060 stainless steel. All of the shear web 46 and 48 are joined by butt strap gussets 50 (FIG. 3) to provide full continuity of the spar shear web. The gussets are spot welded subassemblies prior to going into final spar assembly.

The trailing edge assembly 20 comprise four subassemblies 52, 54, 56 and 58 (FIG. 3). Each of the subassemblies are made substantially the same and are suitably tapered as the blade 12 extends from the inside to its tip. As illustrated in FIG. 3A, the subassembly 52, typical of the other subassemblies 54, 56 and 58, include a fiberglass outer top sheet 60 and a fiberglass outer bottom sheet 62. A forward attaching panel 64 and two end rib caps 66 and 68 are also provided. The pieces 60, 62, 64, 66 and 68 are bonded together with epoxy adhesive. Each subassembly 52, 54, 56 and 58 is filled with approximately two pound cubic foot density rigid urethane foam.

The assemblies 52, 54, 56 and 58 are fixtured and bonded to the stainless steel spar 18 using an elastomeric urethane bond. This bonding material provides compliance between the trailing edge assembly and the stainless steel spar both for temperature variation and also for stress and strain as a result of the flexing of the spar itself. Breaking down the trailing edge into sections avoids the carrying of excessive loads by the trailing edge.

There is a gap approximately ¼" between each of the assemblies 52, 54, 56 and 58 to provide elastic deformation.

The leading edge assembly 22 is constructed in a manner similar to that of the trailing edge assembly 20. The leading edge assembly 22 include four subassemblies 70, 72, 74 and 76 suitably tapered as the blade 12 extends from its inside to its tip. As illustrated in FIG. 3B, the subassembly 70, typical of the other subassemblies 72, 74 and 76, includes a fiberglass plastic sheet 78, a fiberglass plastic closing channel 80 and two fiberglass rib close off elements 82 and 84. The pieces 78, 80, 82 and 84 are bonded together with epoxy adhesive. A stainless steel reinforcing plate 86 is bonded to the leading edge to prevent impact damage. Each of the subassemblies is filled with four pound density rigid urethane foam. The subassemblies 70, 72, 74 and 76 are then fixtured and bonded to the stainless steel spar 18 using an elastomer urethane bond and otherwise applied in a manner similar to the subassemblies of the trailing edge.

The corners of the assemblies of the leading and trailing assemblies may be reinforced with additional plastic where contacts are made with the corners of the spar.

One of the advantages of the present invention is that the spar assembly may be made of sheet metal parts which may be readily twisted to the desired angles during manufacture. Once the spar is formed, the shape of the blade is formed by using foam and plastic material which are readily formable to any desired shape dependent upon the system with which the blade is designed to operate.

During manufacture, the spar assembly 18 preferably is fabricated on a spar assembly fixture. This fixture, not illustrated, may be composed of a base with stations approximately every 24 inches providing a 10° twist to the blade, for example, or other desired angle of twist. Each station will have a holding fixture frame to control final assembly of the spar assembly 18.

The lower spar sheet 28, for example, with angle strips 30, 32, 34 and 36 welded thereto, is fixtured and twisted into position on the fixture. After this is done, the spar shear web assemblies 46 and 48 are fixtured to position and spot welded to the inner angle strips 30 and 32 approximately every 24 inches along the length of the sheet 28.

The upper sheet 26, with angle strips 38, 40, 42 and 44 already welded thereto, is then positioned into place and spot tack welded approximately every 24 inches onto the shear web assemblies 46 and 48. Final spar assembly is then done by welding from both sides of the spar, welding the lower and upper sheets and strips sequentially moving outwardly on both sides of the spar to prevent any distortion or warpage of the spar assembly. This welding may be approximately one and one half inches spacing single row welding. Upon completion of the welding operation, the upper and lower sheet and strip assemblies are elastically twisted in the fixture with a 10° twist for the spar, or other desired angle.

The inboard casting or root fitting 24 which includes four inwardly projecting teeth, provides the means of attachment of the blade 12 to the hub of the windmill. It may be carbon or maganese steel casting, normalized and tempered. As illustrated in FIG. 4, this fitting 24 is machined to match the spar and then bolted into the main spar assembly 18 by means of a number of bolts 88 on either corner. Eleven bolts may be provided in each corner for a total of 44 one-half inch diameter standard bolts. This completes the spar assembly.

It is seen that the blade of the present invention may be made relatively large, is relatively uncomplicated, and may be designed to predictable performances. The materials used make the blade readily manufacturable by mass production techniques.

What is claimed is:

1. A tapered blade structure for use in a windmill including a spar assembly extending the full length of said blade structure and twisted along its length to a predetermined angle and having leading and trailing edge assemblies attached thereto comprising:
   (a) top and bottom spaced flat tapered elongated longitudinally extending metal sheets,
   (b) a pair of tapered angle metal strip elements secured to each of said extending sheets along opposite longitudinal edges thereof, (c) a plurality of relatively short pairs of flat metal shear web channels secured to said angle strip elements between said top and bottom sheets along the length of said sheets, (d) said tapered angle strip elements extending from the inner end of said blade structure towards the tip of said blade structure more than one-half and less than the length of said blade structure, (e) said metal sheets, tapered strip elements, and web channels forming a said spar assembly having a substantially rectangular cross-section, (f) a fitting secured to the ends of said sheets and said shear web channels, (g) a leading edge assembly secured to one side of said spar assembly extending outwardly from one of said pairs of flat metal shear web channels, (h) said leading edge assembly including an outer fiberglass plastic sheet having edge portions extending partly over said top and bottom flat tapered metal sheets, (i) a reinforcing plate bonded to said fiberglass plastic sheet to prevent impact damage, (j) a trailing edge assembly secured to the side opposite said one side of said spar assembly extending outwardly from the other of said pairs of flat metal shear web channels, and (k) said trailing edge assembly including top and bottom fiberglass sheets each having edge portions extending partly over said top and bottom flat tapered metal sheets to join the edge portions of said outer fiberglass plastic sheet of said leading edge assembly.

2. A spar assembly as set forth in claim 1 wherein said tapered angle strip elements include a pair of strip elements including inner and outer strip elements in each corner of said spar assembly.

3. A spar assembly as set forth in claim 2 wherein said inner strip elements are shorter than said outer strip elements and extend from the inner end of said spar assembly.

4. A spar assembly as set forth in claim 3 wherein said web channels are progressively less thick in dimensions as the channels extend from the inner end of said open assembly to the opposite outer end of said spar assembly.

5. A spar assembly as set forth in claim 4 wherein strap gussets are provided to join said web channels to provide full continuity along the length of said spar assembly.

6. The invention as set forth in claim 5 wherein said trailing and leading edge assemblies comprise a plurality of trailing and leading edge subassemblies, respectively.

7. The invention as set forth in claim 6 wherein said trailing and leading edge subassemblies are bonded to said spar assembly with gaps therebetween to provide elastic deformation of the spar assembly without loading the trailing and leading edge assemblies.

8. The invention as set forth in claim 7 wherein said trailing and leading edge subassemblies comprise enclosure filled with foam.

9. The invention as set forth in claim 8 wherein the enclosures for said trailing edge subassemblies comprise a fiberglass top sheet, an outer bottom sheet, a forward attaching channel and two end rib caps bonded together.

10. The invention as set forth in claim 9 wherein the enclosures for said leading edge subassemblies comprise a fiberglass skin, a fiberglass closing panel and two close off ribs all bonded together, and a metal glass member secured to said skin.

* * * * *